US010078956B1

(12) United States Patent
Kusens

(10) Patent No.: US 10,078,956 B1
(45) Date of Patent: Sep. 18, 2018

(54) METHOD AND SYSTEM FOR DETERMINING WHETHER AN INDIVIDUAL TAKES APPROPRIATE MEASURES TO PREVENT THE SPREAD OF HEALTHCARE-ASSOCIATED INFECTIONS

(71) Applicant: CERNER INNOVATION, INC., Kansas City, KS (US)

(72) Inventor: Neil Kusens, Sherman Oaks, CA (US)

(73) Assignee: Cerner Innovation, Inc., Kansas City, KS (US)

( * ) Notice: Subject to any disclaimer, the term of this patent is extended or adjusted under 35 U.S.C. 154(b) by 222 days.

(21) Appl. No.: 14/599,498

(22) Filed: Jan. 17, 2015

Related U.S. Application Data

(60) Provisional application No. 61/928,485, filed on Jan. 17, 2014.

(51) Int. Cl.
*G08B 21/24* (2006.01)
*H04N 7/18* (2006.01)
*H04N 5/232* (2006.01)

(52) U.S. Cl.
CPC ....... *G08B 21/245* (2013.01); *H04N 5/23216* (2013.01); *H04N 7/183* (2013.01)

(58) Field of Classification Search
CPC ...... G08B 19/00; G08B 21/245; G08B 21/00; G08B 21/24; H04N 7/18; G06F 19/321; G06F 19/327; G06F 19/3418; G06F 19/00; G06Q 10/00; G06Q 50/22; H04Q 9/00; H04Q 2209/47; H04Q 2213/13095; H04Q 5/02
See application file for complete search history.

(56) References Cited

U.S. PATENT DOCUMENTS

| | | | |
|---|---|---|---|
| 4,669,263 | A | 6/1987 | Sugiyama |
| 4,857,716 | A | 8/1989 | Gombrich et al. |
| 5,031,228 | A | 7/1991 | Lu |
| 5,276,432 | A | 1/1994 | Travis |
| 5,448,221 | A | 9/1995 | Weller |
| 5,482,050 | A | 1/1996 | Smokoff et al. |
| 5,592,153 | A | 1/1997 | Welling et al. |
| 5,798,798 | A | 8/1998 | Rector et al. |
| 5,838,223 | A | 11/1998 | Gallant et al. |

(Continued)

FOREIGN PATENT DOCUMENTS

| | | | |
|---|---|---|---|
| DE | 19844918 | A1 | 4/2000 |
| WO | 2009018422 | A1 | 2/2009 |
| WO | 2012122002 | A1 | 9/2012 |

OTHER PUBLICATIONS

Notice of Allowance dated Dec. 23, 2016 in U.S. Appl. No. 14/724,969, 5 pages.

(Continued)

*Primary Examiner* — Frank F Huang
(74) *Attorney, Agent, or Firm* — Shook, Hardy & Bacon L.L.P.

(57) ABSTRACT

A system and method that caregivers, central monitoring companies and other persons to monitor whether individuals entering patients' rooms take appropriate steps to mitigate the spread of healthcare associated infections to the patients receiving healthcare services. In one non-limiting the system and method determine whether an individual who has entered the room of a patient has wash his or her hands prior to approaching the patient.

19 Claims, 8 Drawing Sheets

(56) References Cited

Figure 1:
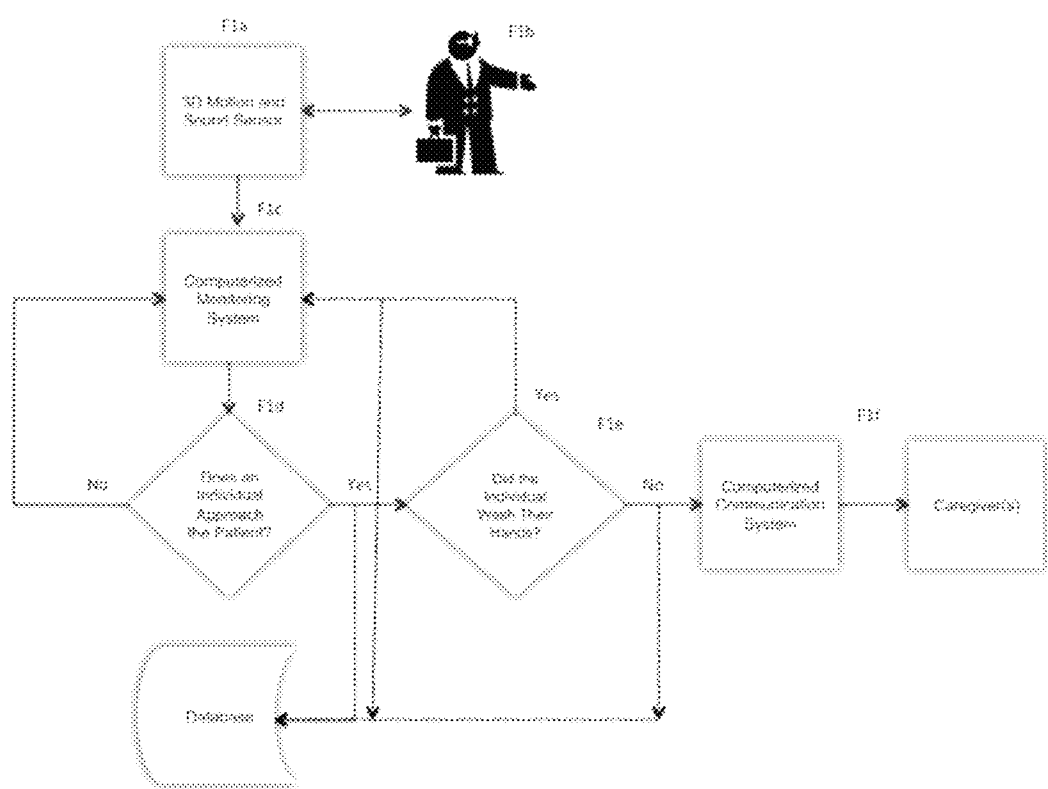

U.S. PATENT DOCUMENTS 5,915,379 A 6/1999 Wallace et al.
5,942,986 A 8/1999 Shabot et al.
6,050,940 A 4/2000 Braun et al.
6,095,984 A 8/2000 Amano et al.
6,160,478 A 12/2000 Jacobsen et al.
6,174,283 B1 1/2001 Nevo et al.
6,188,407 B1 2/2001 Smith et al.
6,269,812 B1 8/2001 Wallace et al.
6,287,452 B1 9/2001 Allen et al.
6,322,502 B1 11/2001 Schoenberg et al.
6,369,838 B1 4/2002 Wallace et al.
6,429,869 B1 8/2002 Kamakura et al.
6,614,349 B1 9/2003 Proctor et al.
6,727,818 B1 4/2004 Wildman et al.
6,804,656 B1 10/2004 Rosenfeld et al.
7,015,816 B2 3/2006 Wildman et al.
7,122,005 B2 10/2006 Shusterman
7,154,397 B2 12/2006 Zerhusen et al.
7,237,287 B2 7/2007 Weismiller et al.
7,323,991 B1 1/2008 Eckert et al.
7,408,470 B2 8/2008 Wildman et al.
7,420,472 B2 9/2008 Tran
7,430,608 B2 9/2008 Noonan et al.
7,502,498 B2 3/2009 Wen et al.
7,612,679 B1 11/2009 Fackler et al.
7,669,263 B2 3/2010 Menkedick et al.
7,715,387 B2 5/2010 Schuman
7,724,147 B2 5/2010 Brown
7,756,723 B2 7/2010 Rosow et al.
7,890,349 B2 2/2011 Cole et al.
7,895,055 B2 2/2011 Schneider et al.
7,908,153 B2 3/2011 Scherpbier et al.
7,945,457 B2 5/2011 Zaleski
7,962,544 B2 6/2011 Torok et al.
7,972,140 B2 7/2011 Renaud
8,108,036 B2 1/2012 Tran
8,123,685 B2 2/2012 Brauers et al.
8,224,108 B2 7/2012 Steinberg et al.
8,237,558 B2 8/2012 Seyed Momen et al.
8,273,018 B1 9/2012 Fackler et al.
8,432,263 B2 4/2013 Kunz
8,451,314 B1 5/2013 Cline et al.
8,529,448 B2 9/2013 McNair
8,565,500 B2 10/2013 Neff
8,620,682 B2 12/2013 Bechtel et al.
8,655,680 B2 2/2014 Bechtel et al.
8,700,423 B2 4/2014 Eaton, Jr. et al.
8,727,981 B2 5/2014 Bechtel et al.
8,769,153 B2 7/2014 Dziubinski
8,890,937 B2 11/2014 Skubic et al.
8,902,068 B2 12/2014 Bechtel et al.
8,917,186 B1 12/2014 Grant
8,953,886 B2 2/2015 King et al.
9,072,929 B1 7/2015 Rush et al.
9,129,506 B1 9/2015 Kusens
9,147,334 B2* 9/2015 Long ........................ H04Q 9/00
9,159,215 B1 10/2015 Kusens
9,269,012 B2 2/2016 Fotland
9,292,089 B1 3/2016 Sadek
9,305,191 B2* 4/2016 Long ........................ G06K 7/01
9,408,561 B2 8/2016 Stone et al.
9,489,820 B1 11/2016 Kusens
9,519,969 B1 12/2016 Kusens
9,524,443 B1 12/2016 Kusens
9,536,310 B1 1/2017 Kusens
9,538,158 B1 1/2017 Rush et al.
9,563,955 B1 2/2017 Kamarshi et al.
9,597,016 B2 3/2017 Stone et al.
9,729,833 B1 8/2017 Kusens
9,741,227 B1 8/2017 Kusens
9,892,310 B2 2/2018 Kusens et al.
9,892,311 B2 2/2018 Kusens et al.
9,892,611 B1 2/2018 Kusens
9,905,113 B2 2/2018 Kusens
2002/0015034 A1 2/2002 Malmborg
2002/0077863 A1 6/2002 Rutledge et al.
2002/0101349 A1 8/2002 Rojas, Jr.
2002/0115905 A1 8/2002 August
2002/0183976 A1 12/2002 Pearce
2003/0037786 A1 2/2003 Biondi et al.
2003/0070177 A1 4/2003 Kondo et al.
2003/0092974 A1 5/2003 Santoso et al.
2003/0095147 A1 5/2003 Daw
2003/0135390 A1 7/2003 O'Brien et al.
2003/0140928 A1 7/2003 Bui et al.
2003/0227386 A1 12/2003 Pulkkinen et al.
2004/0019900 A1 1/2004 Knightbridge et al.
2004/0052418 A1 3/2004 DeLean
2004/0054760 A1 3/2004 Ewing et al.
2004/0097227 A1 5/2004 Siegel
2004/0116804 A1 6/2004 Mostafavi
2004/0193449 A1 9/2004 Wildman et al.
2005/0038326 A1 2/2005 Mathur
2005/0182305 A1 8/2005 Hendrich
2005/0231341 A1* 10/2005 Shimizu ................ B60Q 9/005 340/436
2005/0249139 A1 11/2005 Nesbit
2006/0004606 A1 1/2006 Wendl
2006/0047538 A1 3/2006 Condurso et al.
2006/0049936 A1 3/2006 Collins et al.
2006/0058587 A1 3/2006 Heimbrock et al.
2006/0089541 A1 4/2006 Braun et al.
2006/0092043 A1 5/2006 Lagassey
2006/0107295 A1 5/2006 Margis et al.
2006/0145874 A1 7/2006 Fredriksson et al.
2006/0261974 A1 11/2006 Albert et al.
2007/0085690 A1 4/2007 Tran
2007/0118054 A1 5/2007 Pinhas et al.
2007/0120689 A1 5/2007 Zerhusen et al.
2007/0129983 A1 6/2007 Scherpbier et al.
2007/0136218 A1 6/2007 Bauer et al.
2007/0159332 A1 7/2007 Koblasz
2007/0279219 A1 12/2007 Warriner
2007/0296600 A1 12/2007 Dixon et al.
2008/0001763 A1 1/2008 Raja
2008/0002860 A1 1/2008 Super et al.
2008/0004904 A1 1/2008 Tran
2008/0009686 A1 1/2008 Hendrich
2008/0015903 A1 1/2008 Rodgers
2008/0071210 A1 3/2008 Moubayed et al.
2008/0087719 A1 4/2008 Sahud
2008/0106374 A1 5/2008 Sharbaugh
2008/0126132 A1 5/2008 Warner et al.
2008/0228045 A1 9/2008 Gao et al.
2008/0249376 A1 10/2008 Zaleski
2008/0267447 A1 10/2008 Kelusky et al.
2008/0277486 A1 11/2008 Seem et al.
2008/0281638 A1 11/2008 Weatherly et al.
2009/0082829 A1 3/2009 Panken et al.
2009/0091458 A1 4/2009 Deutsch
2009/0099480 A1 4/2009 Salgo et al.
2009/0112630 A1 4/2009 Collins, Jr. et al.
2009/0119843 A1 5/2009 Rodgers et al.
2009/0177327 A1 7/2009 Turner et al.
2009/0224924 A1 9/2009 Thorp
2009/0278934 A1 11/2009 Ecker et al.
2009/0322513 A1 12/2009 Hwang et al.
2010/0117836 A1 5/2010 Seyed Momen et al.
2010/0169114 A1 7/2010 Henderson et al.
2010/0169120 A1 7/2010 Herbst et al.
2010/0172567 A1 7/2010 Prokoski
2010/0176952 A1 7/2010 Bajcsy et al.
2010/0188228 A1 7/2010 Hyland
2010/0205771 A1 8/2010 Pietryga et al.
2010/0245577 A1* 9/2010 Yamamoto ................ B60R 1/00 348/148
2010/0285771 A1 11/2010 Peabody
2010/0305466 A1 12/2010 Corn
2011/0018709 A1 1/2011 Kornbluh
2011/0022981 A1 1/2011 Mahajan et al.
2011/0025493 A1 2/2011 Papadopoulos et al.
2011/0025499 A1 2/2011 Hoy et al.
2011/0035057 A1 2/2011 Receveur et al.
2011/0035466 A1 2/2011 Panigrahi

(56) References Cited

U.S. PATENT DOCUMENTS

2011/0054936 A1 3/2011 Cowan et al.
2011/0068930 A1 3/2011 Wildman et al.
2011/0077965 A1 3/2011 Nolte et al.
2011/0087079 A1 4/2011 Aarts
2011/0087707 A1 4/2011 Aarts
2011/0102133 A1 5/2011 Shaffer
2011/0102181 A1 5/2011 Metz et al.
2011/0106560 A1 5/2011 Eaton, Jr. et al.
2011/0106561 A1 5/2011 Eaton, Jr. et al.
2011/0175809 A1 7/2011 Markovic et al.
2011/0190593 A1 8/2011 McNair
2011/0227740 A1 9/2011 Wohltjen
2011/0254682 A1 10/2011 Sigrist
2011/0288811 A1 11/2011 Greene
2011/0295621 A1 12/2011 Farooq et al.
2011/0301440 A1 12/2011 Riley et al.
2011/0313325 A1 12/2011 Cuddihy
2012/0025991 A1 2/2012 O'Keefe et al.
2012/0026308 A1 2/2012 Johnson et al.
2012/0075464 A1 3/2012 Derenne et al.
2012/0092162 A1 4/2012 Rosenberg
2012/0098918 A1 4/2012 Murphy
2012/0154582 A1* 6/2012 Johnson ................ G06F 19/321 348/143
2012/0212582 A1 8/2012 Deutsch
2012/0259650 A1 10/2012 Mallon et al.
2013/0027199 A1 1/2013 Bonner
2013/0120120 A1 5/2013 Long et al.
2013/0122807 A1 5/2013 Tenarvitz et al.
2013/0184592 A1 7/2013 Venetianer et al.
2013/0309128 A1 11/2013 Voegeli et al.
2013/0332184 A1 12/2013 Burnham et al.
2014/0039351 A1 2/2014 Mix et al.
2014/0070950 A1 3/2014 Snodgrass
2014/0085501 A1 3/2014 Tran
2014/0155755 A1 6/2014 Pinter et al.
2014/0191861 A1 7/2014 Scherrer
2014/0267625 A1 9/2014 Clark et al.
2014/0327545 A1 11/2014 Bolling et al.
2014/0333744 A1 11/2014 Baym et al.
2014/0354436 A1 12/2014 Nix et al.
2014/0365242 A1 12/2014 Neff
2015/0109442 A1 4/2015 Derenne et al.
2015/0206415 A1 7/2015 Wegelin et al.
2015/0269318 A1 9/2015 Neff
2015/0278456 A1 10/2015 Bermudez Rodriguez et al.
2016/0022218 A1 1/2016 Hayes et al.
2016/0070869 A1 3/2016 Portnoy
2016/0093195 A1 3/2016 Ophardt
2016/0127641 A1 5/2016 Gove
2016/0253802 A1 9/2016 Venetianer et al.
2016/0267327 A1 9/2016 Franz et al.
2017/0055917 A1 3/2017 Stone et al.
2017/0143240 A1 5/2017 Stone et al.

OTHER PUBLICATIONS

Non-Final Office Action dated Jan. 11, 2017 in U.S. Appl. No. 14/611,363, 19 pages.
Non-Final Office Action dated Feb. 23, 2017 in U.S. Appl. No. 14/757,877, 24 pages.
First Action Interview Preinterview Communication dated Feb. 24, 2017 in U.S. Appl. No. 15/395,716, 5 pages.
Notice of Allowance dated Mar. 20, 2017 in U.S. Appl. No. 14/613,866, 11 pages.
Non-Final Office Action dated Oct. 7, 2015 in U.S. Appl. No. 14/339,397, 16 pages.
Non-Final Office Action dated Mar. 11, 2016 in U.S. Appl. No. 14/575,850, 10 pages.
Notice of Allowance dated Aug. 26, 2016 in U.S. Appl. No. 14/743,447, 5 pages.
Notice of Allowance dated Sep. 19, 2016 in U.S. Appl. No. 14/743,499, 5 pages.
Notice of Allowance dated Oct. 14, 2016 in U.S. Appl. No. 14/743,264, 14 pages.
Notice of Allowance dated Nov. 9, 2016 in U.S. Appl. No. 14/743,264, 14 pages.
Notice of Allowance dated Nov. 14, 2016 in U.S. Appl. No. 14/743,447, 5 pages.
Non-Final Office Action dated Apr. 5, 2017 in U.S. Appl. No. 14/623,349, 15 pages.
Notice of Allowance dated Jun. 5, 2015 in U.S. Appl. No. 13/543,816, 5 pages.
Non-Final Office Action dated Feb. 11, 2016 in U.S. Appl. No. 14/724,969, 14 pages.
Non-Final Office Action dated May 23, 2016 in U.S. Appl. No. 14/743,499, 5 pages.
Notice of Allowance dated May 31, 2016 in U.S. Appl. No. 14/743,447, 8 pages.
Notice of Allowance dated Jun. 22, 2016 in U.S. Appl. No. 14/743,447, 4 pages.
Notice of Allowance dated Jun. 27, 2016 in U.S. Appl. No. 14/728,762, 14 pages.
Notice of Allowance dated Jul. 18, 2016 in U.S. Appl. No. 14/743,264, 16 pages.
Final Office Action dated Jul. 28, 2016 in U.S. Appl. No. 14/723,969, 26 pages.
Tom Mooney, "Rhode Island ER first to test Google Glass on medical conditions", http://www.ems1.com/ems-products/cameras-video/articles/1860487-Rhode-Island-ER-first . . . printed on Mar. 11, 2014.
Pending U.S. Application by same inventor Neal Kusens, U.S. Appl. No. 14/613,866, filed Feb. 4, 2015, entitled "Method and System for Determining Whether an Individual Takes Appropriate Measures to Prevent the Spread of Healthcare Associated Infections Along With Centralized Monitoring".
Pending U.S. Application by same inventor Neal Kusens. U.S. Appl. No. 14/611,363, filed Feb. 2, 2015, entitled "Method and System for Determining Whether an Individual Takes Appropriate Measures to Prevent the Spread of Healthcare Associated Infections".
Pending U.S. Application by same inventor Neil Kusens, U.S. Appl. No. 14/084,588, filed Nov. 19, 2013, entitled "Method for Determining Whether an Individual Leaves a Prescribed Virtual Perimeter".
Pending U.S. Application by same inventor Neil Kusens, U.S. Appl. No. 14/575,850, filed Dec. 18, 2014, entitled "Method and Process for Determining Whether an Individual Suffers a Fall Requiring Assistance".
Pending U.S. Application by same inventor Neil Kusens, U.S. Appl. No. 14/611,363, filed Feb. 2, 2015, entitled "Method and System for Determining Whether an Individual Takes Appropriate Measures to Prevent the Spread of Healthcare Associated Infections".
Pending U.S. Application by same inventor Neil Kusens, U.S. Appl. No. 14/613,866, filed Feb. 4, 2015, entitled "Method and System for Determining Whether an Individual Takes Appropriate Measures to Prevent the Spread of Healthcare Associated Infections Along With Centralized Monitoring".
Pending U.S. Application by same inventor Neil Kusens, U.S. Appl. No. 14/724,969, filed May 29, 2015, entitled "Method and Process for Determining Whether an Individual Suffers a Fall Requiring Assistance".
Pending U.S. Application by same inventor Neil Kusens, U.S. Appl. No. 13/543,816, filed Jul. 7, 2012, entitled "Method and Process for Determining Whether an Individual Suffers a Fall Requiring Assistance".
Pending U.S. Application by same inventor Neil Kusens, U.S. Appl. No. 14/727,434, filed Jun. 1, 2015, entitled Method for Determining Whether Enters a Prescribed Virtual Zone Using Skeletal Tracking and 3D Blob Detection.
Pending U.S. Application by same inventor Neil Kusens, U.S. Appl. No. 14/728,762, filed Jun. 2, 2015, entitled "Method for Determining Whether an Individual Leaves a Prescribed Virtual Perimeter".
Pending U.S. Application by same inventor Neil Kusens, U.S. Appl. No. 14/743,264, filed Jun. 18, 2015, entitled "System for Determining Whether an Individual Enters a Prescribed Virtual Zone Using 3D Blob Detection".

(56) References Cited

OTHER PUBLICATIONS

Pending U.S. Application by same inventor Neil Kusens, U.S. Appl. No. 14/743,499, filed Jun. 18, 2015, entitled "System for Determining Whether an Individual Suffers a Fall Requiring Assistance".
Pending U.S. Application by same inventor Neil Kusens, U.S. Appl. No. 14/743,447, filed Jun. 18, 2015, entitled "System for Determining Whether an Individual Suffers a Fall Requiring Assistance".
Non-Final Office Action dated Apr. 27, 2017 in U.S. Appl. No. 15/395,526, 16 pages.
Non-Final Office Action dated May 8, 2017 in U.S. Appl. No. 15/395,250, 19 pages.
Notice of Allowance dated Jul. 24, 2017 in U.S. Appl. No. 15/395,716, 5 pages.
Non-Final Office Action dated Aug. 16, 2017 in U.S. Appl. No. 14/757,593, 8 pages.
Final Office Action dated Aug. 23, 2017 in U.S. Appl. No. 15/285,416, 16 pages.
Notice of Allowance dated Sep. 21, 2017 in U.S. Appl. No. 15/395,526, 13 pages.
Notice of Allowance dated Sep. 26, 2017 in U.S. Appl. No. 15/395,250, 13 pages.
Final Office Action dated Sep. 29, 2017 in U.S. Appl. No. 14/757,877, 22 pages.
Final Office Action dated Oct. 4, 2017 in U.S. Appl. No. 14/623,349, 30 pages.
Notice of Allowance dated Oct. 10, 2017 in U.S. Appl. No. 14/727,434, 9 pages.
Notice of Allowance dated Oct. 20, 2017 in U.S. Appl. No. 15/279,054, 14 pages.
First Action Interview Pre-Interview Communication dated Nov. 22, 2017 in U.S. Appl. No. 15/134,189, 4 pages.
Virtual Patient Observation: Centralize Monitoring of High-Risk Patients with Video-Cisco Video Surveillance Manager, https://www.cisco.com/c/en/us/products/collateral/physical-security/video-surveillance-manager/white paper_ C11-715263.pdf.
Notice of Allowance dated Dec. 6, 2017 in U.S. Appl. No. 15/395,716, 5 pages.
Final Office Action dated Dec. 12, 2017 in U.S. Appl. No. 14/575,850, 10 pages.
Notice of Allowance dated Dec. 29, 2017 in U.S. Appl. No. 14/611,363, 11 pages.
Pending U.S. Application by same inventor Neil Kusens, U.S. Appl. No. 14/623,349, filed Feb. 16, 2015, entitled "Method for Determining Whether an Individual Enters a Prescribed Virtual Zone Using 3D Blob Detection".
Non-Final Office Action dated Sep. 23, 2016 in U.S. Appl. No. 14/727,434, 9 pages.
Non-Final Office Action dated Apr. 11, 2017 in U.S. Appl. No. 15/285,416, 13 pages.
Notice of Allowance dated Apr. 19, 2017 in U.S. Appl. No. 15/395,716, 5 pages.
Notice of Allowance dated Apr. 21, 2017 in U.S. Appl. No. 14/724,969, 9 pages.
Notice of Allowance dated Apr. 25, 2017 in U.S. Appl. No. 14/727,434, 9 pages.
Notice of Allowance dated Jul. 5, 2017 in U.S. Appl. No. 14/727,434, 9 pages.
Final Office Action dated Apr. 28, 2017 in U.S. Appl. No. 14/611,363, 20 pages.
Non-Final Office Action dated Apr. 21, 2017 in U.S. Appl. No. 14/757,593, 9 pages.
Non-Final Office Action dated Apr. 14, 2017 in U.S. Appl. No. 15/396,263, 18 pages.
Final Office Action dated Oct. 18, 2017 in U.S. Appl. No. 15/396,263, 20 pages.
Notice of Allowance dated Nov. 27, 2017 in U.S. Appl. No. 15/279,054, 2 pages.
First Action Interview Office Action dated Nov. 28, 2017 in U.S. Appl. No. 14/244,160, 3 pages.
Notice of Allowance dated Jan. 18, 2018 in U.S. Appl. No. 15/279,054, 2 pages.
Non-Final Office Action dated Feb. 7, 2018 in U.S. Appl. No. 15/396,263, 19 pages.
Notice of Allowance dated Feb. 12, 2018 in U.S. Appl. No. 14/623,349, 12 pages.
Final Office Action dated Feb. 16, 2018 in U.S. Appl. No. 14/757,593, 8 pages.
First Action Interview Office Action dated Feb. 22, 2018 in U.S. Appl. No. 15/134,189, 4 pages.
Non-Final Office Action dated Mar. 12, 2018 in U.S. Appl. No. 15/285,416, 20 pages.
Non-Final Office Action dated Mar. 14, 2018 in U.S. Appl. No. 14/757,877, 13 pages.
Non-Final Office Action dated May 2, 2018 in U.S. Appl. No. 15/728,110, 8 pages.
Non-Final Office Action dated May 7, 2018 in U.S. Appl. No. 14/611,363, 6 pages.
Non-Final Office Action dated May 8, 2018 in U.S. Appl. No. 15/148,151, 5 pages.
Notice of Allowance dated May 9, 2018 in U.S. Appl. No. 15/395,716, 5 pages.
Raheja, et al., "Human Facial Expression Detection From Detected in CapturedImage Using Back Propagation Neural Network", International Journal of Computer Science and Information Technology (IJCSIT), vol. 2, No. 1, Feb. 2010, 8 pages.
First Action Interview Pre-Interview Communication dated May 21, 2018 in U.S. Appl. No. 15/910,645, 14 pages.
Non-Final Office Action dated May 31, 2018 in U.S. Appl. No. 15/395,762, 24 pages.
Non-Final Office Action dated May 31, 2018 in U.S. Appl. No. 15/848,621, 23 pages.
Notice of Allowance dated Jun. 4, 2018 in U.S. Appl. No. 14/757,593, 5 pages.
Non-Final Office Action dated Jun. 8, 2018 in U.S. Appl. No. 15/628,318, 9 new pages.
Notice of Allowance dated Jun. 13, 2018 in U.S. Appl. No. 14/575,850, 5 pages.
Notice of Allowance dated Jun. 18, 2018 in U.S. Appl. No. 14/623,349, 11 pages.
Notice of Allowance dated Jun. 19, 2018 in U.S. Appl. No. 15/395,716, 2 pages.
Final Office Action dated Jul. 5, 2018 in U.S. Appl. No. 15/285,416, 8 pages.
Final Office Action dated Jul. 12, 2018 in U.S. Appl. No. 15/134,189, 23 pages.
Notice of Allowance dated Jul. 13, 2018 in U.S. Appl. No. 15/396,263, 9 pages.
Notice of Allowance dated Jul. 23, 2018 in U.S. Appl. No. 15/728,110, 15 pages.

* cited by examiner

Device Settings

FIGURE 4

- Bed Zone
- Auto Bed Zone (Select Patient)
- Auto Bed Zone (Auto-select)
- Saved Zones
- Patient Zone
- Clear All

FIGURE 5

Configure Kinect: Camera 0

Device Settings Admin

Edit Depth

From Depth (mm) 1000

To Depth (mm)

Delete Save

Configure Kinect: Camera 0
Device
Settings
Admin
Main Settings
Enable Video Feed
Enable Audio Feed
IR

METHOD AND SYSTEM FOR DETERMINING WHETHER AN INDIVIDUAL TAKES APPROPRIATE MEASURES TO PREVENT THE SPREAD OF HEALTHCARE-ASSOCIATED INFECTIONS

This application claims priority to and the benefit of U.S. Application Ser. No. 61/928,485, filed on Jan. 17, 2014, which application is incorporated by reference in its entirety.

1. BACKGROUND

Healthcare-associated infections (HAIs) are infections that are acquired by patients during the course of receiving treatment for other health conditions. According to recent studies, one in every twenty hospitalized patients will acquire an infection during the course of receiving healthcare treatment for a different condition. In terms of the economic impact, studies estimate the overall annual direct medical costs of HAIs range between $28.4 and $45 billion. The medical facility must typically bear the cost of the HAI, which puts a strain on the finances of the healthcare provider.

2. SUMMARY AND DEFINITIONS

The disclosure describes a system and method that is directed to the above problems and provides for a system and method that allows caregivers, central monitoring companies and other persons to monitor whether individuals entering patients' rooms take appropriate steps to mitigate the spread of HAIs to the patients receiving healthcare services. In one non-limiting the system and method determine whether an individual who has entered the room of a patient has wash his or her hands prior to approaching the patient.

Non-limiting definitions that will be used in describing certain embodiments of the present invention include:

| | |
|---|---|
| 31D Motion and Sound Sensor | An electronic device that contains one or more cameras capable of identifying individual objects, people and motion regardless of lighting conditions, as well as one or more microphones to detect audio. The cameras can utilize technologies including but not limited to color RGB, CMOS sensors, infrared projectors and RF-modulated light. They may also contain microprocessors and image sensors to detect and process information both sent out and received by the various cameras.<br>The electronic device can calculate if there has been a change in location of a person or object of interest over a period of time. As a non-limiting example, a person's right knee can be at time T1 located at coordinates (x1, y1, z1) in a picture frame taken by the camera. At time T2 the right knee is capture by the picture frame taken by the camera at coordinates (x2, y2, z2). Based on this information, motion, speed and direction can be derived utilizing the elapsed time and comparing the two 3D coordinates over the elapsed time. As opposed to conventional motion sensors, which use captured motion to control a camera, the 3D Motion and Sound Sensor used with the method and system, uses the camera in order to compute the motion.<br>The camera/sensors are preferably continuously on at all times while the monitoring is occurring, regardless of whether a person or object of interest is moving or not. The camera preferably views the entire room or a large portion of the room simply by its placement in a manner sufficient for the room to be visible to the camera. Thus, the camera does not require any triggering event to cause the camera to begin recording video or transmitting video to the other components of the system for analysis. As the video camera is recording or otherwise transmitting video to the other system components at all times during monitoring, the electronic device is able to immediately track, capture and/or record the individual's movements at all times within the patient's room and will be able to provide information as to whether and when the individual enters the room, whether and when the individual washed his or her hands, whether and when the individual approaches the patients, whether and when the individual leaves the room, etc.<br>Preferably the 3D Motion and Sound Sensor records, captures and/or streams video. As video is technically made up of individual picture frames (i.e. 30 frames per second of video), the above reference to picture frames is referring to frames of video.<br>The 3D Motion and Sound Sensor is located within the room of the patient being monitored and potentially just outside of the patient's room. It is connected to the computerized communication and computerized monitoring systems via a data connection (TCP/IP or comparable technology). |
| Computerized Monitoring System | A computer system programmed to monitor activity of the 3D Motion and Sound sensor(s). The computerized monitoring system will preferably be located within the patient's room and can be connected to the centralized monitoring station at the facility but can also be located at any physical location so long as a data connection (TCP/IP or comparable technology) exists between the computerized monitoring system, the computerized communication system, and 3D motion and sound sensor. The computerized monitoring system preferably makes the determination of a whether and when the individual approaches the patient and whether and when the individual washed his or her hands prior to approaching the patient based on the data received by the video camera sensors. |

-continued

| | |
|---|---|
| Computerized Communication System | A computer system programmed to facilitate communication between the patient and/or individual and computerized monitoring system in the event it is determined that the individual did not wash his or her hands prior to approaching the patient. This system may include but is not limited to amplified speakers, microphones, lights, monitors, computer terminals, mobile phones and or other technologies to allow for the electronic communication to take place. The system can also be designed to notify the individual that they need to wash their hands also through a text message or other electronic message sent to the individual's smart phone, pager, etc. The computerized communication system will preferably be located within the patient's room being monitored but certain components of the system are mobile by their nature (i.e. mobile phones, pagers, computers) and can also be located at any location so long as a data connection (TCP/IP or comparable technology) exists between the computerized monitoring system, the computerized communication system, and 3D motion and sound sensor. |
| Healthcare-associated infection (HAI) | Infections acquired by individuals while receiving healthcare services in an institutional setting or other location where the healthcare services are being provided |
| System Database | A computer database that electronically stores records of all alerts generated, notifications, confirmation requests, responses, reconfirmation requests and any other desired information concerning the individual's entry, visit, movements, actions and/or exit within the patient's room. |
| Caregiver | A relative, friend, individual, company or facility whose purpose is to provide assistance in the care of daily living activities for individuals who are disabled, injured, elderly or otherwise in need of assistance. |

3. BRIEF DESCRIPTION OF THE DRAWINGS

FIG. 1 is a workflow flowchart for monitoring and determining whether an individual who enters a patient's room takes the appropriate steps required (such as, but not limited to, washing his or her hands) prior to approaching the patient; and.

Figures 2, 3:
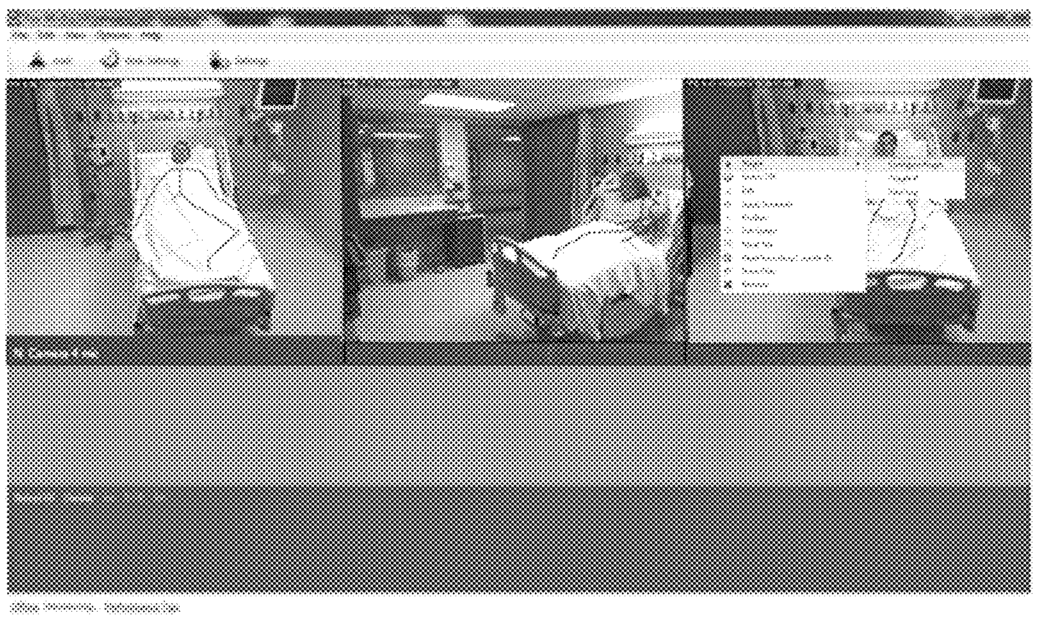

FIGS. 2 though 14 illustrate various screen shots for configuring the system for operation.

4. DETAILED DESCRIPTION OF DRAWINGS

A hand-washing compliance determination for an individual entering a patient's room, prior to the individual approaching the patient is illustrated in FIG. 1. Hand-washing compliance is considered non-limiting and the system and method can be used to determine if the individual is compliant with other activities or events prior, during or after approaching the patient, including, but not limited to, other activities that if not undertaken are also know to assist or aid in the spread of HAIs.

Specifically, FIG. 1 shows the workflow for monitoring whether an individual takes appropriate measures to prevent the spread of HATs through the use of 3D Motion and Sound sensors. At step F1a, one or more 3D Motion and Sound sensors can be installed in a patient's room, home, hospital room, or other place of temporary or permanent residence. At step 1b, the one or more 3D Motion and Sound sensors can be configured to recognize the patient and other individuals using biometric identifiers such as facial recognition, height, distance between points on the body, etc. Alternatively or additionally, a virtual three-dimensional zone around the patient can be created through a software application portion of the system to define an area around the patient. When the individual is a certain predetermined distance from the area or enters the area can be recognized as the event for determining that the individual is approaching the patient.

Furthermore, as the system can be programmed to recognize the patient as described above and below, the system can also be programmed to allow the virtual zone around the patient follow the patient, if the patient moves around the room or out of the bed. As a non-limiting example, if the patient is sitting in a chair within the room, as the system recognizes the patient by the biometric identifiers, the location virtual zone can be shifted so that it remains around the patient while the patient sits in the chair. Accordingly, the determination of whether the individual is approaching the patient can be then made based on the patient's current position in the chair. Other non-limiting examples include the patient being in the restroom, the patient looking out their window, etc.

At step F1c, data from the one or more 3D Motion and Sound sensors are sent to a computerized monitoring system. At step F1d, when (or if) the computerized monitoring system detects or determines an individual, who is not the patient, entering the area (such as the virtual area discussed above) where a patient resides and approaching the patient it will make a record in the database of such event and attempt to determine whether an appropriate measure has been taken by said individual to mitigate the spread of infection using one or more methods including but not limited to washing their hands or utilizing hand sanitation soaps, gels or lotions. Where the location of the hand sanitizer, sink, etc. is outside of the patient's room, one or more additional 3D Motion and Sound sensors can be positioned and configured in order to determine (capture) whether the individual washed and/or sanitized their hands prior to entering the patient's room. This captured video can also be stored and/or reviewed by the Computerized Monitoring System when the system makes its determination. Depending on the setup of the particular room, the location of a 3D Motion and Sound sensor and/or the coverage area seen capabilities of the 3D Motion and Sound sensor, it is possible that a single 3D Motion and Sound sensor may be able to provide information concerning the patient's defined virtual zone and also provide the information regarding whether the individual washed his or her hands, etc.

"Washing hands", "Washing his or her hands", etc. shall be defined to include traditional hand washing, hand sanitizing, etc.

A record can also be electronically entered in a database to record a lack of compliance and/or compliance by the individual. Where the individual is in compliance, the computerized monitoring system will continually monitor the data being sent from the one or more 3D motion and sound sensors. Additionally, where a lack of compliance is detected, the computerized monitoring system can be programmed to automatically begin, or manually restarted to begin, again monitoring data from the one or more 3D motion and sound sensors. However, at all times during operating the 3D motion and sound sensors are on and are capturing, recording and/or streaming video from the room and/or just outside the room, and do not require a triggering event to initiate recording.

At step F1e, when the system detects that an appropriate action has been taken by the individual to mitigate the spread of infections, a record can be made in the database and audible and/or visible alerts can be issued to the individual acknowledging said compliance. Should the individual continue to approach or remain in the vicinity of the patient without having taken appropriate steps to mitigate the spread of infections, an audible and/or visible alert to such individual, notifying said individual of the need to take preventative measures to prevent the spread of infections can be sent by the computerized communication system. Other personal notifications to the individual can also be sent such as calling the individuals cell phone or smart phone, sending a text message, calling the individual's pager, etc. The system can monitor, using gesture recognition, location tracking or other measures whether said individual has taken appropriate steps to mitigate the spread of infection such as washing their hands or utilizing hand sanitation soaps, gels or lotions. Particularly with location tracking, virtual zones can also be defined around the hand washing sink, to determine or detect if the individual entered the sink zone prior to approaching the patient. It is also within the scope of the invention, to provide a water flow sensor which can be in electronic communication with one or more components of the system (i.e. computerized monitoring system). The water flow sensor can be provided or in communication with the water flow line of the sink, such that when the hot and/or cold water valve of the sink is opened to permit water flow into the sink, the sensor sends a signal representing such information to the system.

At step F1f, if the individual approaching the patient or within close proximity to the patient fails to comply with the audible and/or visible warnings to comply, notification can be given to the caregivers, individual's employer and/or other designated persons that the individual has failed to comply. Notification of caregivers can be made through phone call, text messaging, speakerphone systems, email, or other electronic means of communication. The system database can also be updated to reflect actions taken.

Where an individual breathing on the patient is also an issue for the particular patient and/or whether exposure to a patient with an infectious disease is an issue, the Computerized Monitoring System can also be programmed to determine whether or not the individual is wearing a mask. The present invention method would go through similar steps of monitoring and notification as described above for the "hand washing" monitoring. Though "mask" monitoring preferably would be in addition to "hand washing" monitoring, it is within the scope of the invention that the system is also programmed to monitor "mask" monitoring, without "hand washing" monitoring. Similarly, if the individual is required to be wearing gloves, similar steps can also be performed to confirm compliance or alert for non-compliance.

FIGS. 2 through 14 illustrate several set up screen shots for configuring the virtual zones and alert types. In FIG. 2, the bed zone can be configured for a given or specific 3D Motion and Sound Sensor. To begin configuration, the user can hover over the 3D Motion and Sound Sensor video window with the cursor, right-click, select plugin and then select configure plug-in. A window will popup showing the 3D Motion and Sound Sensors' feed. The user selects the icon for the type of zone they wish to draw, which as a non-limiting example and illustrative purposes, can be a bed zone (See FIG. 3). Similar steps are taken for creating the above-mentioned virtual sink zone, where provided.

Figures 4, 5:
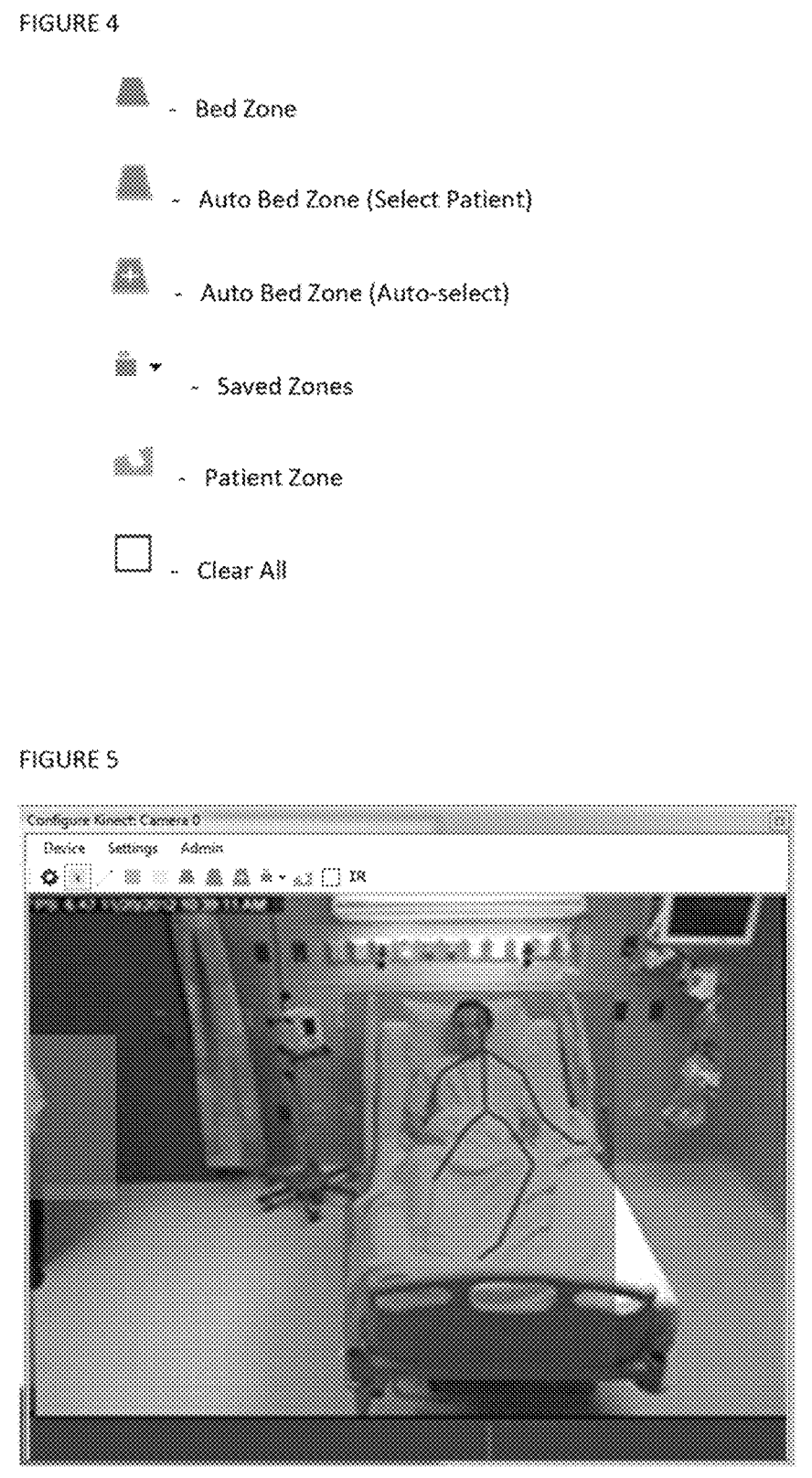

As non-limiting examples, the icons that appear on the screen for selection can include the following symbols shown in FIG. 4. In this non-limiting example, in no particular order, some of the icons include, Bed Zone, Auto Bed Zone (Select Patient), Auto Bed Zone (Auto-select), Saved Zones, and Clear All.

Figures 6, 7:
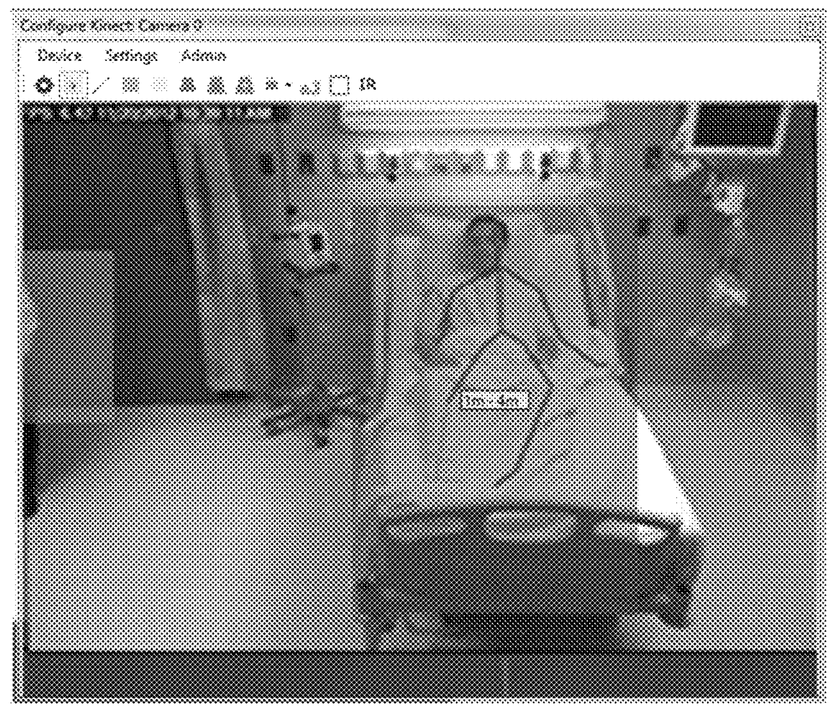

As seen in FIG. 5, to place a zone, the user clicks on the screen where he or she would like to start the zone. Then, the cursor is moved to the corner point for zone and clicked again. The user continues to select additional points until the zone is drawn to the user's satisfaction. Preferably, the user clicks on the round end point of the beginning of the zone to complete the zone (See FIG. 5). When the zone has been completed, the zone can appear and a depth range box (i.e. square, rectangle, etc. disposed over the patient on the screen) can be provided on the screen, such as, but not limited to, in the middle of the screen or zone (see FIG. 7), though any location on the screen is considered within the scope of the invention. As seen in FIG. 7, upon completion the zone appears and has a depth range box preferably in the middle.

As seen in FIG. 6, the user can adjust the depth range for any given zone. By preferably double clicking on the depth range box or by other conventional selection methods an Edit Depth window can appear. The user can enter in the depth ranges (preferably in millimeters (mm) though not considered limiting) and then the user can click the Save button or icon when done to store the entered values.

If there are any other types of zones to draw for the particular sensor, the above steps are repeated to place the next zone and the depth setting can be adjusted for each if necessary. Additionally, all zones can be cleared by clicking on or otherwise selecting the Clear All icon in the toolbar. Once all of the zones/wires are configured, the user can close the window to finish or can be provided with the option to save the zone configuration for later use.

Figures 8, 9:
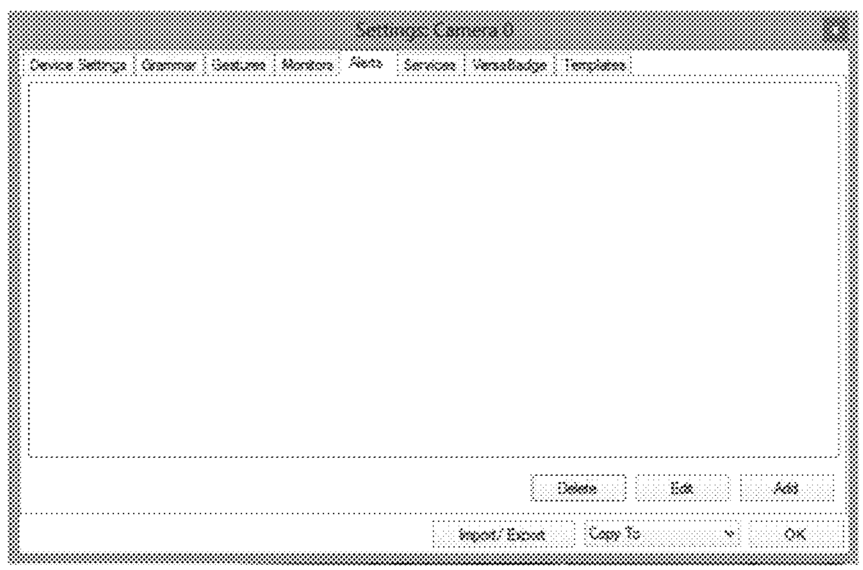

As seen in FIG. 8, to access the main settings window, the user can click or otherwise select the Settings menu and the select Main Settings from the drop-down list. As one non-limiting alternative, the user can click on the Gear icon (✿) or other designated icon in the toolbar to access the main settings window.

Figure 10:
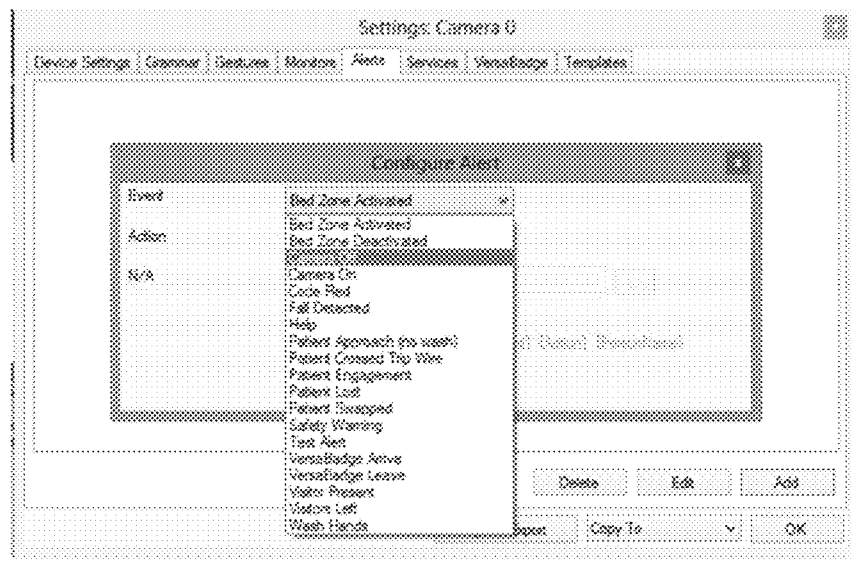

As seen in FIG. 9, for one non-limiting way to configure a new Alert, the user can select the Alerts tabs and then click on or otherwise select the Add button, which can result in the Configure Alert box appearing on the screen (See FIG. 10). As seen in FIG. 10, under the Event field, the user can then select the event from the drop down list that they wish the user wishes to send an alert on. Though not shown, the dropdown list can include an alert for non-compliance with hand washing, non-compliance for not wearing breathing mask, etc.

Figure 11:
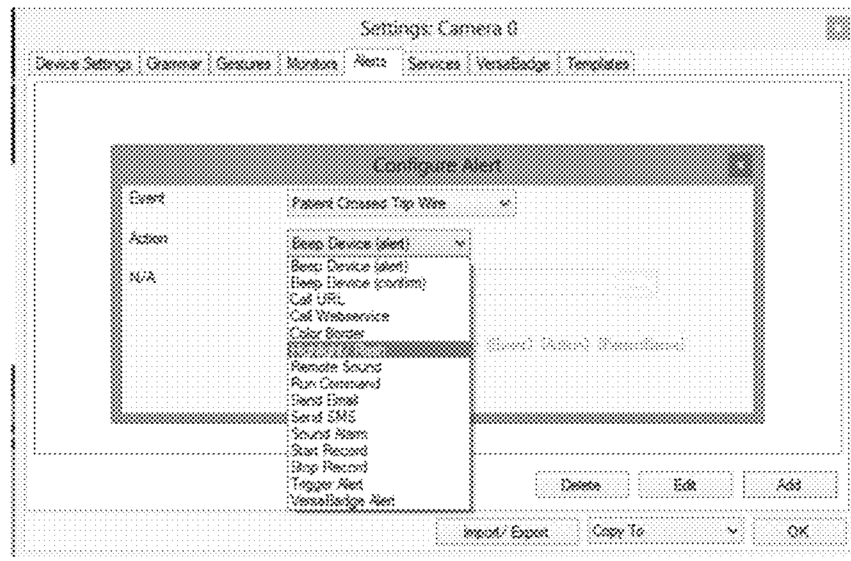
Figure 12:
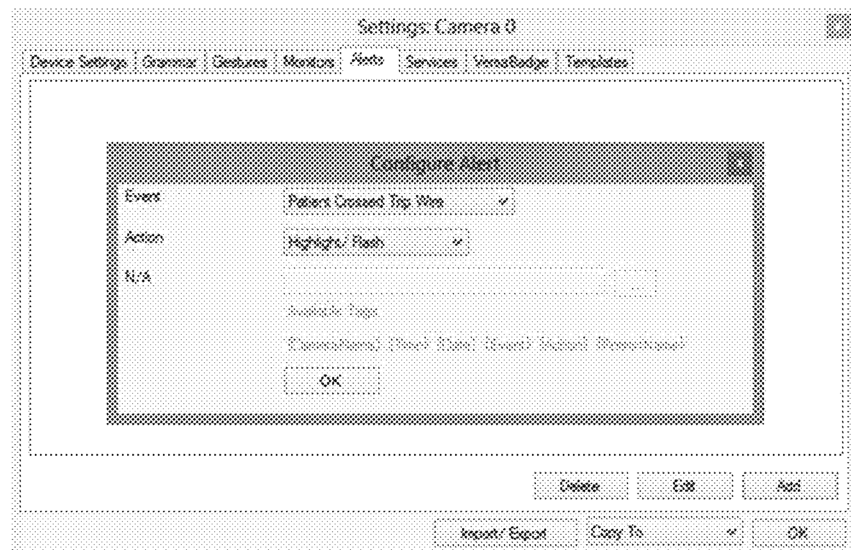
Figure 13:
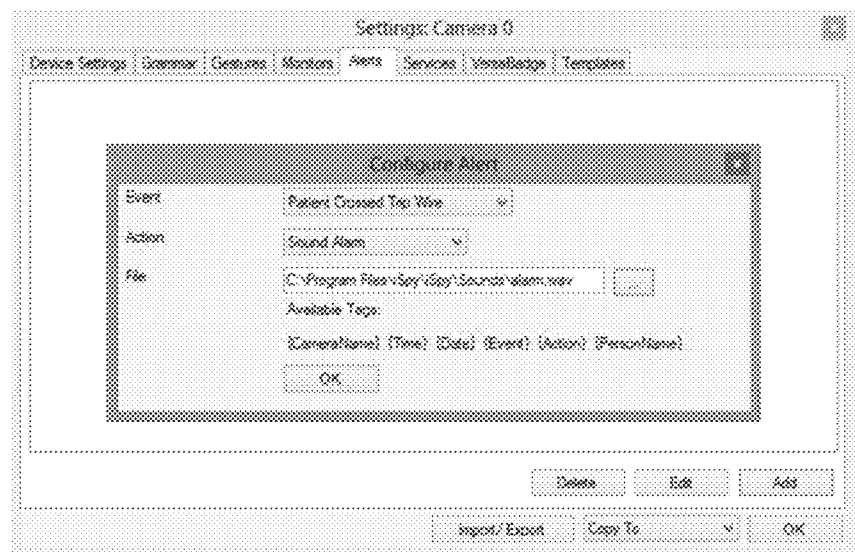
Figure 14:
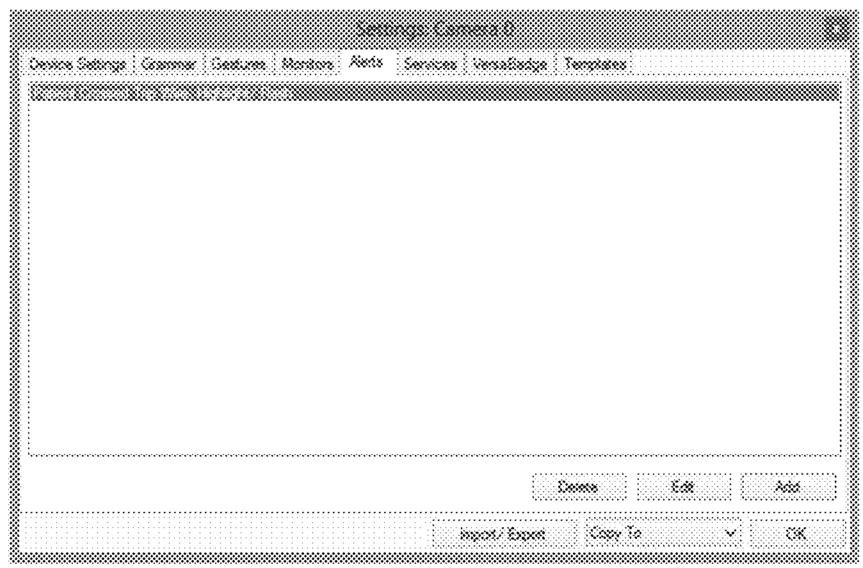

As seen in FIG. 11, once the Event type is selected, under the Action field, the user can select the Action he or she wishes to have the system perform when the selected Event is detected or determined. Once the Event and Action have be selected the OK button (See FIG. 12) can be selected to save the selected entries.

For certain Actions an additional field may need to be completed to finish the Action. If the field is required, it can appear below the Action dropdown (See FIG. 13). If no further fields are required, the Configure Alert box can display N/A (See FIG. 12) or just be blank. As mentioned above, once all settings are selected, the user clicks or otherwise selects the OK button, which causes the new Alert to be listed in the Alerts tab window. To edit an existing Alert, the user first clicks on or otherwise selects the Alert and then selects the Edit button (See FIG. 14). To delete an Alert, first highlight it can then click on the Delete button (See FIG. 14).

To add more Alerts, the user clicks or selects the Add button and repeats the above described steps. Once finished, the user clicks on or otherwise selects the bottom corner OK button to save and close the window.

The above described system uses several components, including, but not limited to:

1. One or more 3D Motion and Sound Sensors. However, it also within the scope of the invention to eliminate the sound sensor and have the functions of the invention be performed with only 3D motion sensors that are continuously on and record, capture and/or stream video.
2. Computerized Monitoring System in electronic communication with the one or more 3D Motion and Sound Sensors; and
3. Computerized Communication System in electronic communication with the Computerized Monitoring System.

The various components can be in electrical, wired and wireless communication with each other.

The automatic detection and notification or individuals who do not take appropriate steps to prevent the spread of infections will provide significant administrative and clinical benefits to caregivers and individuals alike, including, but not limited to, the following public benefits:

1. Automation of preventative measure detection and notification of caregivers or other designated entities.
2. Reduction in incidences of HAIs.
3. Increased survival rate for individuals who are susceptible to HAIs
4. Reduction in costs for hospitalization and medical care related to HAIs.

All components of the present invention system and their locations, electronic communication methods between the system components, electronic storage mechanisms, etc. discussed above or shown in the drawings, if any, are merely by way of example and are not considered limiting and other component(s) and their locations, electronic communication methods, electronic storage mechanisms, etc. can be chosen and used and all are considered within the scope of the invention.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

While the invention has been described and disclosed in certain terms and has disclosed certain embodiments or modifications, persons skilled in the art who have acquainted themselves with the invention, will appreciate that it is not necessarily limited by such terms, nor to the specific embodiments and modification disclosed herein. Thus, a wide variety of alternatives, suggested by the teachings herein, can be practiced without departing from the spirit of the invention, and rights to such alternatives are particularly reserved and considered within the scope of the invention.

What is claimed is:

1. A method for detecting whether an individual who enters a room of a patient washes his or her hands prior to approaching the patient, said method performed by a computerized monitoring system and comprising the steps of:

configuring a virtual patient zone defining an area around a patient who is located within a room;

receiving live video data from one or more 3D motion and sound sensors configured to capture the live video data from the room;

automatically adjusting a placement of the virtual patient zone within the room based on movement of the patient within a viewing range of the one or more 3D motion and sound sensors such that the virtual patient zone remains around the patient when the patient moves within the room;

determining, from the live video data, when an individual is a certain distance from the virtual patient zone or has entered the virtual patient zone;

determining, from the live video data, whether the individual washed his or her hands where it is determined that the individual is within a certain distance from the virtual patient zone or has entered the virtual patient zone; and electronically initiating an alert or notification to the individual upon determining that the individual did not wash his or her hands.

2. The method for detecting of claim 1 further comprising the step of updating a database in communication with the computerized monitoring system regarding the determination that the individual did not wash his or her hands prior to being within a certain distance from the virtual patient zone or has entered the virtual patient zone.

3. The method for detecting of claim 1 further comprising the step of notifying a previously designated caregiver by electronic message regarding the determination that the individual did not wash his or her hands prior to being within a certain distance from the virtual patient zone or has entered the virtual patient zone.

4. The method for detecting of claim 1 wherein configuring the virtual patient zone comprises the steps of:

receiving a selection of a patient zone from a choice of icons appearing on a screen of a display where the live video feed from the one or more 3D motion and sound sensors is visible on the screen;

receiving an indication to create an end point where the patient zone begins from a selection on the screen by an electronic cursor;

receiving a selection of a corner point for the patient zone from the electronic cursor selecting the corner point on the screen; and receiving selections for remaining corner points for the patient zone and receiving an indication to complete the virtual patient zone from selections on the screen by the electronic cursor.

5. The method for detecting of claim 4 further comprising receiving an indication of a depth range input by a user in a depth range box displayed on the screen.

6. The method for detecting of claim 5 wherein the depth range box is displayed on the screen within a portion of the completed virtual patient zone.

7. The method for detecting of claim 1 further comprising the step of configuring the type of alert or alarm to generate in the event that it is determined that the individual did not wash his or her hands prior to being within a certain distance from the virtual patient zone or entering the virtual patient zone.

8. The method for detecting of claim 1 wherein the one or more 3D motion and sound sensors are programmed to lock on the patient and forward data to the computerized monitoring system representing 3D coordinates of body joints for the patient and a general skeletal outline of the monitored individual.

9. A method for detecting when an individual who enters a room of a patient washes his or her hands prior to approaching the patient, said method performed by a computerized monitoring system and comprising the steps of:

configuring a virtual patient zone defining an area around a patient who is located within a room, wherein the computerized monitoring system is located within the room;

receiving live video data from one or more 3D motion and sound sensors configured to capture the live video data from the room;

automatically adjusting a placement of the virtual patient zone within the room based on movement of the patient within a viewing range of the one or more 3D motion and sound sensors such that the virtual patient zone remains around the patient when the patient moves within the room;

determining, from the live video data, when an individual is a certain distance from the virtual patient zone or has entered the virtual patient zone based on locations of specific body segments of the individual being within a certain predetermined or preconfigured distance from the virtual patient zone or located in the virtual patient zone;

determining, from the live video data, whether the individual washed his or her hands where it is determined that the individual is within a certain distance from the virtual patient zone or has entered the virtual patient zone; and electronically initiating an alert or notification to the individual upon determining that the individual did not wash his or her hands.

10. The method for detecting of claim 9 further comprising the step of updating a database in communication with the computerized monitoring system regarding the determination that the individual did not wash his or her hands prior to being within a certain distance from the virtual patient zone or entering the virtual patient zone.

11. The method for detecting of claim 9 further comprising the step of notifying a previously designated caregiver by electronic message regarding the determination that the individual did not wash his or her hands prior to being within a certain distance from the virtual patient zone or entering the virtual patient zone.

12. The method for detecting of claim 9 wherein configuring the virtual patient zone comprises the steps of:

receiving a selection of a patient zone from a choice of icons appearing on a screen of a display where the live video feed from the one or more 3D motion and sound sensors is visible on the screen;

receiving an indication to create an end point where the patient zone begins from a selection on the screen by an electronic cursor;

receiving a selection of a corner point for the patient zone from the electronic cursor selecting the corner point on the screen; and receiving selections for remaining corner points for the patient zone and receiving an indication to complete the virtual patient zone from selections on the screen by the electronic cursor.

13. The method for detecting of claim 12 further comprising receiving an indication of a depth range input by a user in a depth range box displayed on the screen.

14. The method for detecting of claim 13 wherein the depth range box is displayed on the screen within a portion of the completed virtual patient zone.

15. The method for detecting of claim 9 further comprising the step of configuring the type of alert or alarm to generate in the event that it is determined that the individual did not wash his or her hands prior to being within a certain distance from the virtual patient zone or entering the virtual patient zone.

16. The method for detecting of claim 6 wherein the one or more 3D motion and sound sensors are programmed to lock on the patient and forward data to the computerized monitoring system representing 3D coordinates of body joints for the patient and a general skeletal outline of the monitored individual.

17. A method for detecting when an individual who enters a room of a patient washes his or her hands prior to approaching the patient, said method performed by a computerized monitoring system and comprising the steps of:

configuring a virtual patient zone defining an area around a patient who is located within a room;

receiving live video data from one or more 3D motion and sound sensors configured to capture the live video data from the room;

automatically adjusting a placement of the virtual patient zone within the room based on movement of the patient within a viewing range of the one or more 3D motion and sound sensors such that the virtual patient zone remains around the patient when the patient moves within the room;

determining, from the live video data, when an individual is a certain distance from the virtual patient zone or has entered the virtual patient zone based on locations of specific body segments of the individual being within a certain predetermined or preconfigured distance from the virtual patient zone or located in the virtual patient zone;

determining, from the live video data, whether the individual washed his or her hands where it is determined that the individual is within a certain distance from the virtual patient zone or has entered the virtual patient zone; and electronically initiating an alert or notification to the individual upon determining that the individual did not wash his or her hands.

18. The method for detecting of claim 17 further comprising the step of notifying a previously designated caregiver by electronic message regarding the determination that the individual did not wash his or her hands prior to being within a certain distance from the virtual patient zone or has entered the virtual patient zone.

19. The method for detecting of claim 17 wherein configuring the virtual patient zone comprises the steps of:

receiving a selection of a patient zone from a choice of icons appearing on a screen of a display where the live video feed from the one or more 3D motion and sound sensors is visible on the screen;

receiving an indication to create an end point where the patient zone begins from a selection on the screen by an electronic cursor;

receiving a selection of a corner point for the patient zone from the electronic cursor selecting the corner point on the screen; and receiving selections for remaining corner points for the patient zone and receiving an indication to complete the virtual patient zone from selections on the screen by the electronic cursor.

* * * * *

UNITED STATES PATENT AND TRADEMARK OFFICE

CERTIFICATE OF CORRECTION

PATENT NO. : 10,078,956 B1
APPLICATION NO. : 14/599498
DATED : September 18, 2018
INVENTOR(S) : Neil Kusens It is certified that error appears in the above-identified patent and that said Letters Patent is hereby corrected as shown below:

In the Specification

Column 1-2 (Table), Line 20: Please remove "31D" and replace with --3D--.
Column 3-4 (Table), Line 7: Please remove "and or" and replace with --and/or--.
Column 3-4 (Table), Line 21: After "provided" insert --.--.
Column 3, Line 35: Please remove "though" and replace with --through--.
Column 3, Line 48: Please remove "know" and replace with --known--.
Column 3, Line 51: Please remove "HATs" and replace with --HAIs--.
Column 7, Line 44: After "HAIs" insert --.--.

In the Claims

Column 10, Line 29: Please remove "claim 6" and replace with --claim 9--.

Signed and Sealed this
Twentieth Day of November, 2018

Andrei Iancu
*Director of the United States Patent and Trademark Office*